US006463163B1

(12) United States Patent
Kresch (10) Patent No.: US 6,463,163 B1
(45) Date of Patent: *Oct. 8, 2002

(54) SYSTEM AND METHOD FOR FACE DETECTION USING CANDIDATE IMAGE REGION SELECTION

(75) Inventor: Renato Kresch, Haifa (IL)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,052

(22) Filed: Jan. 11, 1999

(51) Int. Cl.[7] .................................................. G06H 9/00
(52) U.S. Cl. ........................ 382/103; 382/118; 348/169
(58) Field of Search ................................. 382/103, 157, 382/228, 190, 118, 209, 100; 348/169

(56) References Cited

U.S. PATENT DOCUMENTS

| | | | | |
|---|---|---|---|---|
| 5,048,100 A | * | 9/1991 | Kuperstein | 382/36 |
| 5,216,724 A | * | 6/1993 | Suzuki et al. | 382/7 |
| 5,642,431 A | | 6/1997 | Poggio et al. | 382/118 |
| 5,680,481 A | * | 10/1997 | Prasada et al. | 382/190 |
| 5,710,833 A | * | 1/1998 | Moghaddam et al. | 382/228 |
| 6,075,895 A | * | 6/2000 | Qiao et al. | 382/218 |
| 6,088,040 A | * | 7/2000 | Oda et al. | 345/435 |
| 6,141,434 A | * | 10/2000 | Christian et al. | 382/103 |

OTHER PUBLICATIONS

Henry A. Rowley, Shumeet Baluja, and Takeo Kanade, "Neural Network–Based Face Detection," *IEEE Transactions on Pattern Analysis and Machine Intelligence*, vol. 20, No. 1, Jan. 1998, pp. 23–38.

Veronica Vilaplana and Ferran Marques, "Face Segmentation Using Connected Operators," the proceedings of the International Symposium on Mathematical Morphology and Its Applications to Image and Signal Processing, Kluwer Academic Publishers, Dordrecht, The Netherlands, 1998, pp. 207–214.

* cited by examiner

*Primary Examiner*—Leo Boudreau
*Assistant Examiner*—M B Choobin (57) ABSTRACT

A face detection system and a method of pre-filtering an input image for face detection utilize a candidate selector that selects candidate regions of the input image that potentially contains a picture of a human face. The candidate selector operates in conjunction with an associated face detector that verifies whether the candidate regions contain a human face. In the preferred embodiment, the candidate selector includes a linear matched filter and a non-linear filter that operate in series to select the candidate regions from the input image. Initially, the linear matched filter performs a linear correlation on the input image using a filtering kernel to derive a correlation image. The linear matched filter selects regions of the input image that have a local maximum in the correlation image and have correlation values greater than a threshold correlation value. Preferably, the linear correlation is performed in the discrete cosine transform (DCT) domain. The non-linear filter then examines contrast values from various sub-regions of the image regions that were selected by the linear matched filter to screen for suitable candidate regions. The filtering kernel used by the linear matched filter is calculated during a training period, or a non-face detecting period, by a filtering-kernel generator. The filtering kernel is preferably computed utilizing a database of training face images that have been averaged and then masked to remove DC, illumination and noise components.

19 Claims, 9 Drawing Sheets

| 0,0 | 0,1 | 0,2 | 0,3 | 0,4 | 0,5 | 0,6 | 0,7 |
|---|---|---|---|---|---|---|---|
| 1,0 | 1,1 | 1,2 | 1,3 | 1,4 | 1,5 | 1,6 | 1,7 |
| 2,0 | 2,1 | 2,2 | 2,3 | 2,4 | 2,5 | 2,6 | 2,7 |
| 3,0 | 3,1 | 3,2 | 3,3 | 3,4 | 3,5 | 3,6 | 3,7 |
| 4,0 | 4,1 | 4,2 | 4,3 | 4,4 | 4,5 | 4,6 | 4,7 |
| 5,0 | 5,1 | 5,2 | 5,3 | 5,4 | 5,5 | 5,6 | 5,7 |
| 6,0 | 6,1 | 6,2 | 6,3 | 6,4 | 6,5 | 6,6 | 6,7 |
| 7,0 | 7,1 | 7,2 | 7,3 | 7,4 | 7,5 | 7,6 | 7,7 |

SYSTEM AND METHOD FOR FACE DETECTION USING CANDIDATE IMAGE REGION SELECTION

TECHNICAL FIELD

The invention relates generally to image pattern detection and recognition and more particularly to a system and a method for face detection.

DESCRIPTION OF THE RELATED ART

Vast amounts of digital information, including images, are currently available via the Internet or other electronic databases. Unlike text information, content-based searches of images containing a picture of a target object from these databases is a challenging task. The difficulty arises from the fact that the pictures of the target objects in the stored images, in general, are not identical. Moreover, the target object depicted in one image may have a different orientation and size from the identical target object depicted in another image.

Face detection technology is being advanced, in part, to assist in the development of an image retrieval system that can overcome the above-described difficulty. Face detection is a process of determining whether a picture of a human face is present in an input image and, if so, accurately determining the position(s) of the face(s) within the input image. A face detector is designed to scan the input image to detect human faces that may be depicted in the image, regardless of the size of the human faces. There are two prominent approaches to face detection, a "neural network-based" approach and an "eigenface" approach.

The neural network-based approach utilizes, as the name suggests, a neural network to detect a human face in an input image. The fundamental ideal of the neural network-based approach is to design a neural network that accepts an N×M image block and outputs a binary answer indicating a positive or a negative detection of a human face within the image block. The neural network is trained using a large database of training image blocks. The training image blocks are a mixture of face images and non-face images. The training image blocks are typically preprocessed before being input to the neural network. The preprocessing may include removing the DC component in the image block and normalizing the image block. After the neural network has been trained, an input image can be analyzed by the neural network during an on-line detection procedure in which N×M image blocks of the input image are preprocessed in the same manner as the training image blocks.

A publication by Henry A. Rowley, Shumeet Baluja and Takeo Kanade, entitled "Neural Network-Based Face Detection," *IEEE Transactions on Pattern Analysis and Machine Intelligence*, Vol. 20, No. 1, pages 23–28, January 1998, describes a neural network-based face detection system. The face detection system of Rowley et al. utilizes a modified version of the standard neural network-based face detection approach. In particular, the Rowley et al. face detection system uses the training image blocks that have been erroneously detected as containing a human face to further train the neural network in a "bootstrap" manner. The publication asserts that the bootstrapping technique reduces the number of training image blocks that are required to sufficiently train the neural network. In addition, the Rowley et al. face detection system includes neutralization of illumination differences in image blocks during the preprocessing procedure by removing the best-fit linear function from the image blocks.

The eigenface approach involves calculating the best linear basis, or principal eigenvector components, called "eigenfaces" to approximate a set of training faces. These basis vectors are then used as convolution kernels for matched filtering to detect human faces in an input image. U.S. Pat. No. 5,710,833 to Moghaddam et al. describes an apparatus for detection and recognition of specific features in an image using an eigenface approach. The Moghaddam et al. apparatus utilizes all eigenvectors, not just the principal eigenvector components. The use of all eigenvectors is intended to increase the accuracy of the apparatus to detect complex multi-featured objects.

Although the conventional face detection systems operate well for their intended purposes, what is needed is a face detection system and a method of detecting faces that increase face detection performance in terms of speed and accuracy.

SUMMARY OF THE INVENTION

A face detection system and a method of pre-filtering an input image for face detection utilize a candidate selector that selects candidate regions of the input image that potentially contain a picture of a human face. The candidate selector operates in series with an associated face detector that verifies whether the candidate regions do contain a human face. The pre-filtering operation performed by the candidate selector screens out much of the input image as regions that do not contain a human face. Since only the candidate regions are then processed by the face detector, the operation of the candidate selector reduces the amount of computational processing that must be performed by the face detector.

In the preferred embodiment, the candidate selector includes a linear matched filter and a non-linear filter that operate in series to select the candidate regions of the input image. The linear matched filter operates to select image regions that have highly similar image patterns when compared to a face template. The linear matched filter includes a linear correlator and a processing module. The linear correlator performs a linear correlation on the input image using a filtering kernel to derive a correlation image. The filtering kernel is a numerical representation of the face template. The filtering kernel is calculated during a training period, or a non-face detecting period, by a filtering-kernel generator. Preferably, the linear correlation is performed in the discrete cosine transform (DCT) domain, but other approaches are available. The correlation image is then examined by the processing module. The processing module is configured to select temporary candidate regions of the input image using a decision rule. The decision rule dictates that only image regions that are positioned about a local maximum in the correlation image and have pixel correlation values that are greater than a threshold correlation value are to be selected. The temporary candidate regions are then transmitted to the non-linear filter.

The non-linear filter operates to determine whether the temporary candidate regions should be deemed as the candidate regions. The non-linear filter examines contrast values within certain regions of a temporary candidate region, seeking a contrast pattern that is characteristic of eyes of a human face. High contrast values at these regions equate to a likelihood that an image region contains a human face. In one embodiment, the non-linear filter includes three contrast calculators and a decision module. The contrast calculators compute contrast values for particular upper segments of an image region. The first contrast calculator computes a contrast value for an upper-half segment of the image region. The second contrast calculator computes contrast values for two upper quadrants of the image region. Thus, the first and second contrast calculators are dedicated to the top fifty percent of a temporary candidate region. The third contrast calculator computes contrast values for three adjacent segments that define a portion of the upper-half segment, e.g., the top thirty-three percent of the temporary candidate region. These contrast values are transmitted to the decision module. The contrast values computed by the second and third contrast calculators are compared to a threshold contrast value. If these values exceed the threshold contrast value, the image region is deemed to be a candidate region and is transmitted to the face detector. In an alternative configuration, the three contrast calculators may be embodied in a single contrast calculator.

The face detector of the system may utilize a neural network-based approach, an eigenface approach or any other known technique to detect a human face in the candidate regions. In the preferred embodiment, the face detector is a face detection system of Rowley et al., utilizing the original face detection scheme. In the most preferred embodiment, the face detector is the face detection system of Rowley et al., utilizing a fast version of the original face detection scheme. The face detector operates to receive the candidate regions from the candidate selector and determine whether the one or more of candidate regions contain a human face. The determination by the face detector may be displayed on a display device in which a verified candidate region is identified by superimposing an outline of the region over the original input image.

In order to detect faces of different sizes, the face detection system includes an image scaler that modifies the scale of the input image. The image scaler receives the input image and sequentially transmits the input image in smaller scales to the candidate selector. The first transmitted input image may be the input image in the original scale. In the preferred embodiment, the image scaler decreases the scale of the input image by a factor of 1.2. However, other reductions may be utilized.

The system may include a filtering-kernel generator that provides the filtering kernel for the linear matched filter of the candidate selector. The filtering-kernel generator is configured to calculate the filtering kernel from a large database of sample face images. The filtering-kernel generator does not operate during an on-line operation, i.e., a face detecting procedure. Instead, the calculation of the filtering kernel is performed during an off-line operation, i.e., a training procedure. The filtering kernel is calculated prior to the face detecting procedure.

The filtering-kernel generator includes an averaging unit, a DCT operator, a masker and an inverse discrete cosine transform (IDCT) operator. The calculation of the filtering kernel begins when the large database of sample face images of a fixed size is input to the averaging unit. Preferably, the face images are 8×8 pixel images. The averaging unit averages the face images to derive an averaged image and outputs the averaged image to the DCT operator. The DCT operator transforms the averaged image from the spatial domain to the DCT domain. The transformed image is then transmitted to the masker. The masker removes DC, illumination and noise frequency components from the transformed image. Next, the averaged image is transformed back to the spatial domain by the IDCT operator. The resulting image is the filtering kernel. This filtering kernel is stored in a memory of the system, until requested by the linear matched filter. When used in a linear correlation, the filtering kernel also removes the components of the input image that are associated with the DC, illumination and noise influences.

In an alternative embodiment, the training face images are first transformed from the spatial domain to the DCT domain, masked, transformed back to the spatial domain, and then averaged to derive the filtering kernel. In this alternative embodiment, the DCT operator initially receives the training images. The DCT operator then transforms each received training face image from the spatial domain to the DCT domain. Next, the masker discards the DC, illumination and noise components from the transformed face images. The IDCT operator transforms the masked face images back to the spatial domain. The face images are then averaged by the averaging unit to derive the filtering kernel.

An advantage of the invention is that the candidate selector is not operatively limited to a particular type of face detectors and may be used in conjunction with a variety of conventional face detectors. Another advantage is that the speed of face detection can be significantly increased by the use of the candidate selector, depending on the particular type of face detector utilized. Furthermore, the accuracy, in terms of mis-detections, of certain face detectors can be increased by the use of the candidate selection.

DETAILED DESCRIPTION

Figure 1:
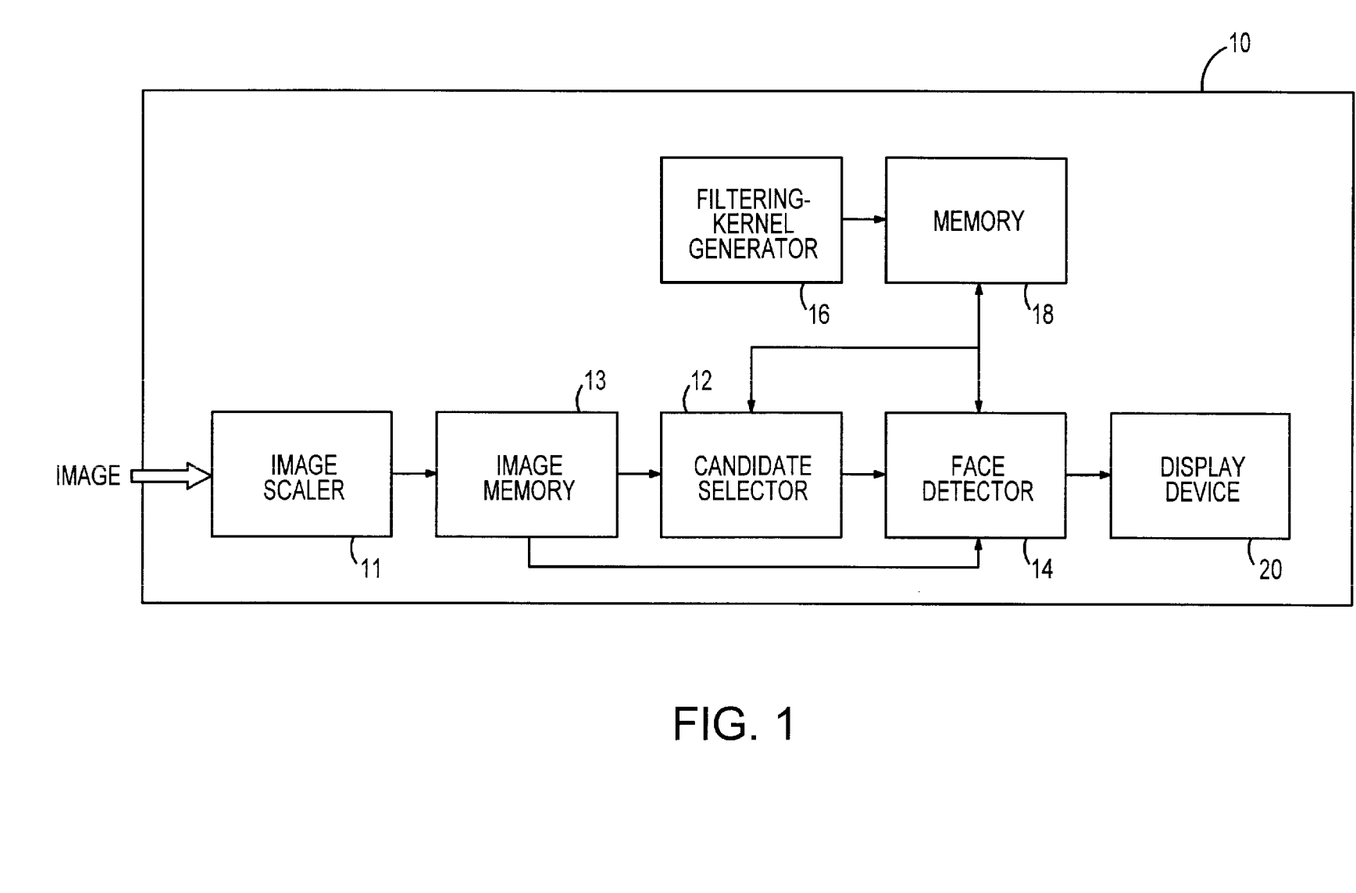
FIG. 1 is a block diagram of components of a face detection system in accordance with the present invention.

With reference to FIG. 1, a face detection system 10 in accordance with the invention is shown. The face detection system 10 includes an image scaler 11, a candidate selector 12, an image memory 13, a face detector 14, a filtering-kernel generator 16, a memory 18 and a display device 20. The face detection system 10, like other known face detection systems, operates to detect human faces in an input digital image, regardless of variations in size and orientation of the depicted human faces, by examining the input image at various scales. However, unlike conventional face detection systems, the face detection system 10 utilizes a candidate selection scheme performed by the candidate selector 12. The candidate selection scheme involves pre-filtering an input image to select one or more regions of the input image that potentially contain a human face. Consequently, the non-selected regions of the input image are screen out as unlikely candidates for containing faces. Only the selected regions are further processed by the face detector 14 to determine whether the selected image regions do contain a human face. This screening process, performed by the candidate selector 12, reduces the number of computations that need to be performed by the face detector 14. Although the face detector system 10 is specifically designed to detect human faces, the face detector system 10 can be readily modified to detect a different image pattern, as well as multiple image patterns.

The candidate selector 12 of the system 10 is operationally coupled to the image scaler 11, the image memory 13, the filtering-kernel generator 16, and the memory 18, as well as the face detector 14. The image scaler 11 modifies the scale of an input image, in order for the system 10 to detect human faces of different sizes in the image. The image scaler 11 receives an input image and sequentially transmits the input image in smaller scales to the image memory 13. The first transmitted input image may be the input image in the original scale. In the preferred embodiment, the image scaler 11 decreases the scale of the input image by a factor of 1.2. All of the scaled images stored in the image memory 13 are accessible by the candidate selector 12 and the face detector 14. Therefore, the candidate selector 12 is able to access one scaled image, while the face detector 14 is accessing another scaled image.

The filtering-kernel generator 16 is designed to generate and provide a filtering kernel to the candidate selector 12 via the memory 18.

Although the memory 18 is shown as a separate component, the memory 18 may be embodied in a single unit with the image memory 13. The filtering kernel is a numerical representation of a face template that is used by the candidate selector 12 to perform the selection operation. The filtering-kernel generator 16 will be further described below with reference to FIG. 6. Memory 18 provides stored data that is utilized by the candidate selector 12 and the face detector 14, including the filtering kernel. The face detector 14 is configured to produce an output signal in response to a positive or negative determination of whether the candidate regions contain a human face. The output signal is received by the display device 20. The display device 20 may be a computer monitor. An output signal indicating a positive detection of a human face within a candidate region by the face detector 14 may be displayed on the display device 20 by superimposing an outline of the candidate region over the original input image. In an alternative embodiment, the display device 20 is replaced with a processing module, such as a face recognition module, a face counting module or a security system, that receives the output signal for further processing.

The face detector 14 is a conventional device that may utilize a neural network-based approach, an eigenface approach or any other known technique to detect human faces within the selected regions. In the preferred embodiment, the face detector 14 is a neural network-based face detector. In the most preferred embodiment, the face detector 14 is the face detection system of Rowley et al., utilizing a fast version of the original face detection scheme. The fast version scheme of Rowley et al. will be fully described below. The original face detection scheme of Rowley et al., as well as the fast version, are described in the publication entitled "Neural Network-Based Face Detection." The Rowley et al. publication is incorporated herein by reference. Although the face detector 14 may utilize one of many known face detection schemes, the face detector 14 will be described herein in the most preferred embodiment, i.e., the fast version scheme of Rowley et al.

Figure 2:
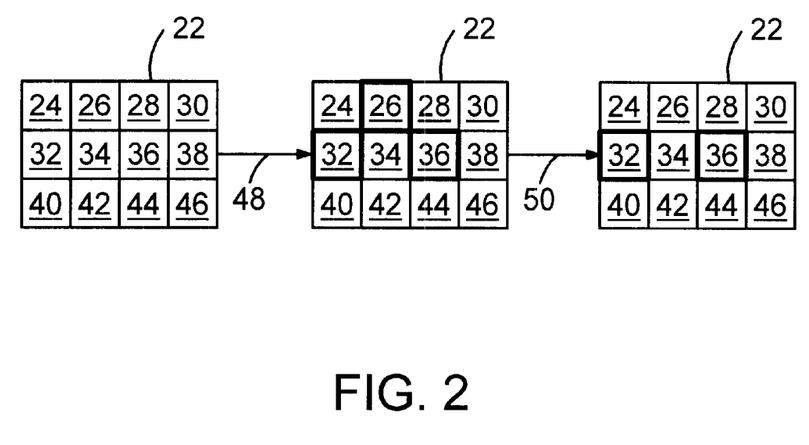
FIG. 2 is an illustration of an input image at various points along the face detection system of FIG. 1.

An overall operation of the candidate selector 12 and the face detector 14 of the face detection system 10 will be described with reference to FIG. 2. In FIG. 2, an input image 22 at various points along the face detection system 10 is illustrated. The far left input image 22 represents the image prior to being input to the candidate selector 12 of the face detection system 10. The middle input image 22 represents the image after being processed by the candidate selector 12. The far right input image 22 represents the image after being processed by the face detector 14. The input image 22 may be a scaled version of the original input image. The input image 22 is divided into regions 24, 26, 28, 30, 32, 34, 36, 38, 40, 42, 44 and 46. The regions 24–46 represent regions where a human face is potentially located. Regions of the input image 22 that are checked by the face detection system 10 include regions that overlap the regions 24–46. However, for simplification, the overlapping regions of the image 22 have been ignored.

Initially, the input image 22 is received by the candidate selector 12 from the image memory 13. An arrow 48 represents the operation performed by the candidate selector 12. After receiving the input image 22, the candidate selector 12 examines each region 24–46 of the image 22 to select candidate regions that potentially contain a human face. The candidate selector 12 utilizes certain criteria to determine whether a particular region should be designated as a candidate region. The criteria utilized by the candidate selector 12 will be described below. Assuming that the regions 32 and 36 contain a human face, the candidate selector 12 may select, for example, regions 26, 32 and 36, as illustrated in the middle image 22 of FIG. 2 by the darkened outlines in the respective regions.

Next, the image 22 is further processed by the face detector 14. An arrow 50 represents the operation performed by the face detector 14. The face detector 14 examines only the candidate regions, i.e., regions 26, 32 and 36, that were selected by the candidate selector 12. The face detector 14 performs a known face detection technique to determine whether a human face is contained within the regions 26, 32 and 36. The face detector 14, in essence, verifies the accuracy of the candidate selector 12 to select regions that contain a face. As illustrated in the far right image 22, the face detector 14 has made a positive determination that regions 32 and 36 contain a human face. The face detector 14 has made a negative determination with respect to region 26, concluding that region 26 does not contain a face. In this example, the combined operation of the candidate selector 12 and the face detector 14 has correctly identified the two regions that contain a human face. Without the candidate selector 12, the face detector 14 would have examined every region of the image 22 to determine whether any of the regions contain a human face. However, since the candidate selector 12 had screened out most of the regions as non-face containing regions, the face detector 14 was required to only examine the three candidate regions 26, 32 and 36, thereby reducing the number of computations that are performed by the face detector 14.

Figure 3:
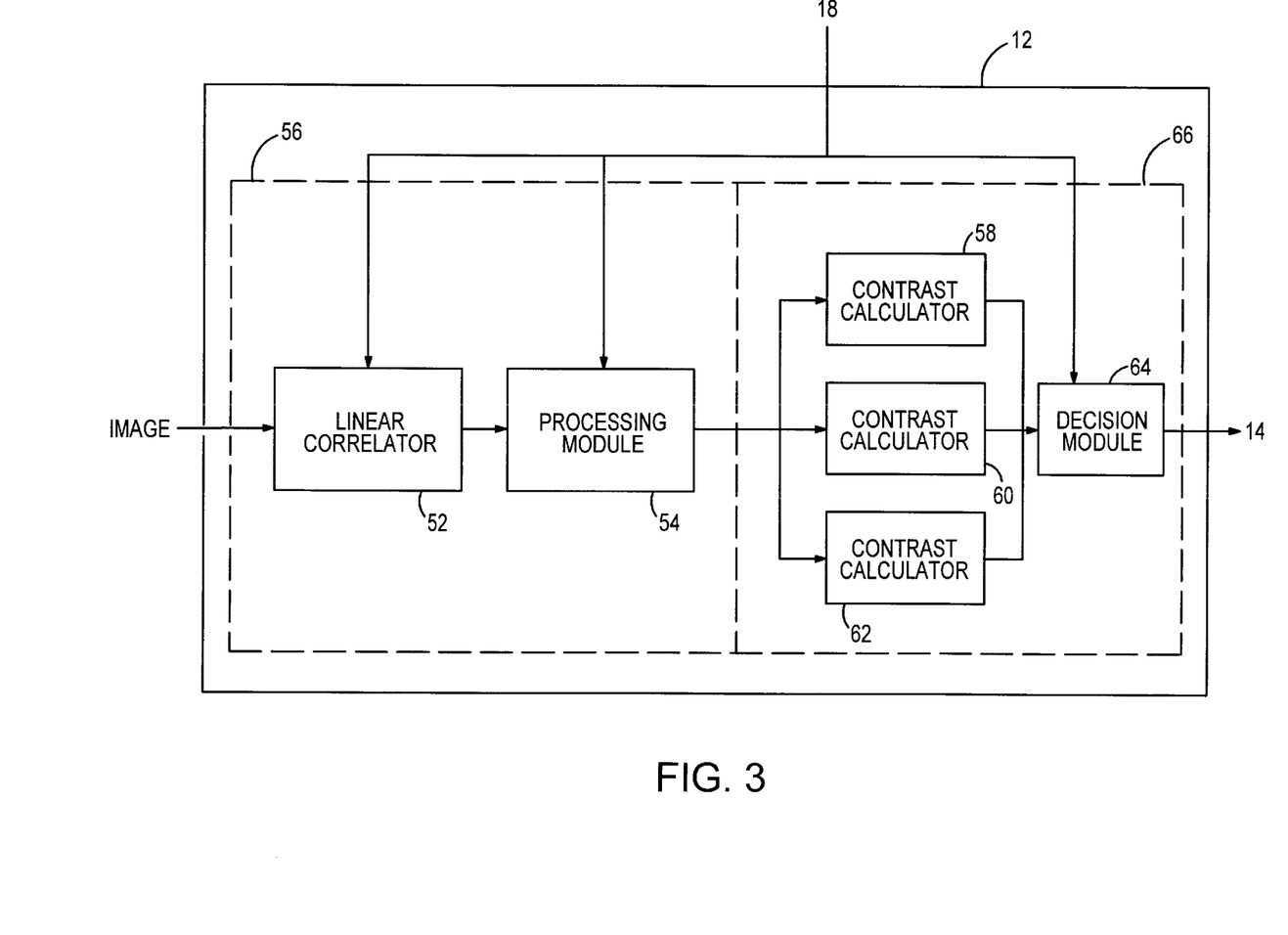
FIG. 3 is a block diagram of components of a candidate selector, shown in FIG. 1.

Turning now to FIG. 3, components of the candidate selector 12 are shown. The candidate selector 12 includes a linear correlator 52 and a processing module 54, which form a linear matched filter 56. The candidate selector 12 also includes contrast calculators 58, 60 and 62 and a decision module 64, which form a non-linear filter 66. The linear matched filter 56 operates to select a number of temporary candidate regions of an input image that have a likelihood of containing a human face, using certain criteria. The selected temporary candidate regions are then examined by the non-linear filter 66, where another criterion is used to discard undesirable temporary candidate regions. The resulting regions are the candidate regions that will be further processed by the face detector 14. The combined operation of the filters 56 and 66 increases the accuracy of the candidate selector 12 to select the most suitable candidate regions.

The linear matched filter 56 performs a linear matched filtering technique to select the temporary candidate regions of an input image. The matched filtering technique includes a linear-convolution step and a decision step. The linear convolution step, also called "linear correlation", is performed by the linear correlator 52 on an input image using a certain N×N filtering kernel. The input image may be a scaled version of the original input image. The N×N filtering kernel is calculated by the filtering-kernel generator 16 and stored in memory 18. The linear convolution step may be performed in the discrete cosine transform (DCT) domain, the spatial domain or other appropriate domains.

In the preferred embodiment, the linear convolution step is performed in the DCT domain. The DCT domain offers a computational complexity reduction for a linear convolution operation, as compared to other domains. For example, a linear convolution can usually be performed faster in a frequency domain, such as the DCT domain, than in the spatial domain. In addition, many of the DCT coefficients of natural image blocks are null or very close to null. Therefore, the arithmetic operations involving these DCT coefficients can be avoided. Furthermore, if the input image is in JPEG, MPEG, or other DCT-based compression standard, the DCT coefficients are readily available, whereas extracting the spatial domain data requires an inverse DCT operation. The linear convolution in the DCT domain that is performed by the linear correlator 52 will be mathematically described below. The linear convolution operation converts the input image into a correlation image. In the most preferred embodiment, the linear convolution step is performed in the DCT domain using discrete sine transform (DST) coefficients in accordance with an implicit scheme to reduce the number of required computations. The implicit scheme is mathematically described below.

The correlation image is then transmitted to the processing module 54. The processing module 54 selects regions of an input image that satisfy a matched filtering decision rule as temporary candidate regions. The processing module 54 is configured such that only regions that contain a local maximum in the correlation image and have pixel correlation values that are greater than a fixed threshold value $T_L$ are selected. The local maximum is a location on the correlation image where the correlation value is greater than the correlation values of the surrounding locations. The threshold value $T_L$ may be stored in memory 18 and provided to the processing module 54, when requested by the processing module. Each temporary candidate region is preferably an 8×8 pixel region and each pixel within a selected temporary candidate region has a correlation value greater than $T_L$. Furthermore, the temporary candidate regions should be selected such that a local maximum is located in the center of the temporary candidate region. The selected temporary candidate regions are transmitted to the non-linear filter 66.

For each temporary candidate region, the non-linear filter 66 analyzes the local contrast values within predetermined sub-regions of the temporary candidate region. The predetermined sub-regions correspond to the expected positions of the eyes of a human face within the temporary candidate region. The temporary candidate regions having local contrast values greater than a threshold contrast value are assumed to contain an eye and are identified as the candidate regions. The temporary candidate regions having local contrasts less than or equal to the threshold contrast value are assumed not to contain an eye and are discarded.

Figure 4:
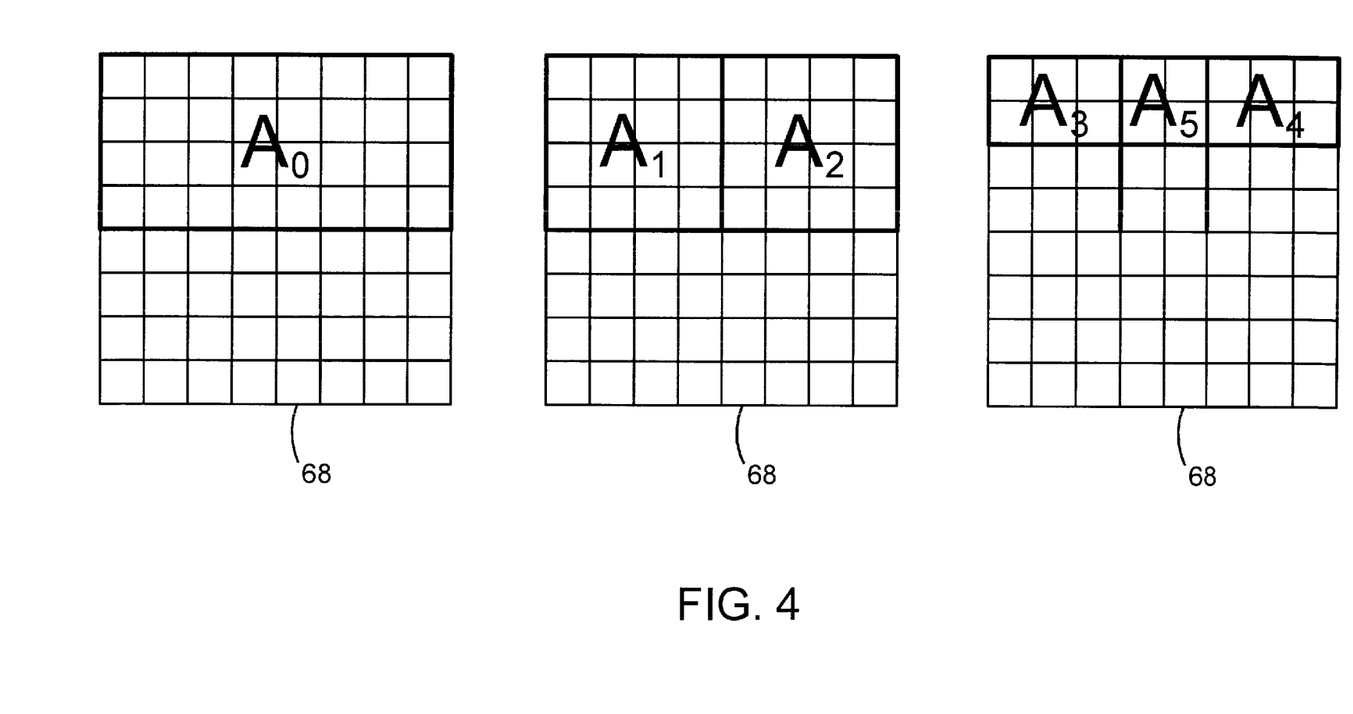
FIG. 4 is an illustration of sub-regions of an 8×8 image region that are examined by the candidate selector of FIG. 3.

The contrast calculators 58, 60 and 62 of the non-linear filter 66 compute the local contrast values within the predetermined sub-regions of the temporary candidate regions. These sub-regions are shown in FIG. 4. A temporary candidate region 68 is illustrated as an N×N pixel region, where N=8. Six sub-regions $A_0$, $A_1$, $A_2$, $A_3$, $A_4$ and $A_5$ of various sizes are illustrate in FIG. 4. These sub-regions $A_{0'}$, $A_{1'}$, $A_{2'}$, $A_{3'}$, $A_{4'}$ and $A_{5'}$ are defined by the following equations, where $W(i,j)$, $0<i, j \leq N-1$ is the temporary candidate region 68:

$$A_0 \triangleq \{(i,j) | 0 \leq i \leq (N/2)-1, 0 \leq j \leq N-1\}$$

$$A_1 \triangleq \{(i,j) | 0 \leq i \leq (N/2)-1, 0 \leq j \leq (N/2)-1\}$$

$$A_2 \triangleq \{(i,j) | 0 \leq i \leq (N/2)-1, N/2 \leq j \leq N-1\}$$

$$A_3 \triangleq \{(i,j) | 0 \leq i \leq \lceil N/4 \rceil-1, 0 \leq j \leq \lceil 3N/8 \rceil-1\}$$

$$A_4 \triangleq \{(i,j) | 0 \leq i \leq \lceil N/4 \rceil-1, \lfloor 5N/8 \rfloor \leq j \leq N-1\}$$

$$A_5 \triangleq \{(i,j) | 0 \leq i \leq \lceil N/4 \rceil-1, \lfloor 3N/8 \rfloor \leq j \leq \lceil 5N/8 \rceil-1\}.$$

The contrast calculator 58 computes the contrast value for sub-region $A_0$. The contrast value for sub-region $A_0$ equals $M_0 - m_0$, where $M_0$ represents the maximum grayscale value within the sub-region $A_0$ and $m_0$ represents the minimum grayscale value within the sub-region $A_0$. The following equations can be used to find any $M_K$ and $m_K$:

$$M_K \triangleq \max_{(i,j) \in A_K} W(i,j)$$

$$m_K \triangleq \min_{(i,j) \in A_K} W(i,j)$$

Similarly, the contrast calculator 60 computes the contrast values $M_1 - m_1$ and $M_2 - m_2$ for sub-regions $A_1$ and $A_2$, respectively. The contrast calculator 62 computes the remaining contrast values $M_3 - m_3$, $M_4 - m_4$ and $M_5 - m_5$ for sub-regions $A_3$, $A_4$ and $A_5$, respectively.

These computed contrast values for the sub-regions are utilized by the decision module 64 to determine whether the temporary candidate region 68 should be selected as a final candidate region. The decision module 64 determines that the temporary candidate region 68 is a candidate region, if and only if, each computed contrast value of the sub-regions $A_1$, $A_2$, $A_3$, $A_4$ and $A_5$ is greater than $T_0$, or, mathematically stated, $$\min \{M_1-m_1, M_2-m_2, M_3-m_3, M_4-m_4, M_5-m_5\} > T_0,$$

where $T_0 \triangleq \min \{(M_0-m_0)/4, T_N\}$.

$T_N$ is a given contrast threshold value that is provided to the decision module 64. The value $T_N$ may be stored in the memory 18 and provided to the decision module 64, when requested by the decision module. Only the temporary candidate regions that satisfy the above criterion are selected as candidate regions. The selected candidate regions are then transmitted to the face detector 14. Although the contrast calculators 58, 60 and 62 are shown in FIG. 3 as three separate components, these contrast calculators may be embodied in a single component.

In a less preferred embodiment, the candidate selector 12 only includes the linear matched filter 56. In this less preferred embodiment, the temporary candidate regions selected by the linear matched filter 56 are directly transmitted to the face detector 14. In another less preferred embodiment, the candidate selector 12 only includes the non-linear filter 66. In this embodiment, the non-linear filter 66 would scan every N×N region of the input image at each scaled level. Any N×N region meeting the contrast criterion will be selected as a candidate region and transmitted to the face detector 14.

Figure 5:
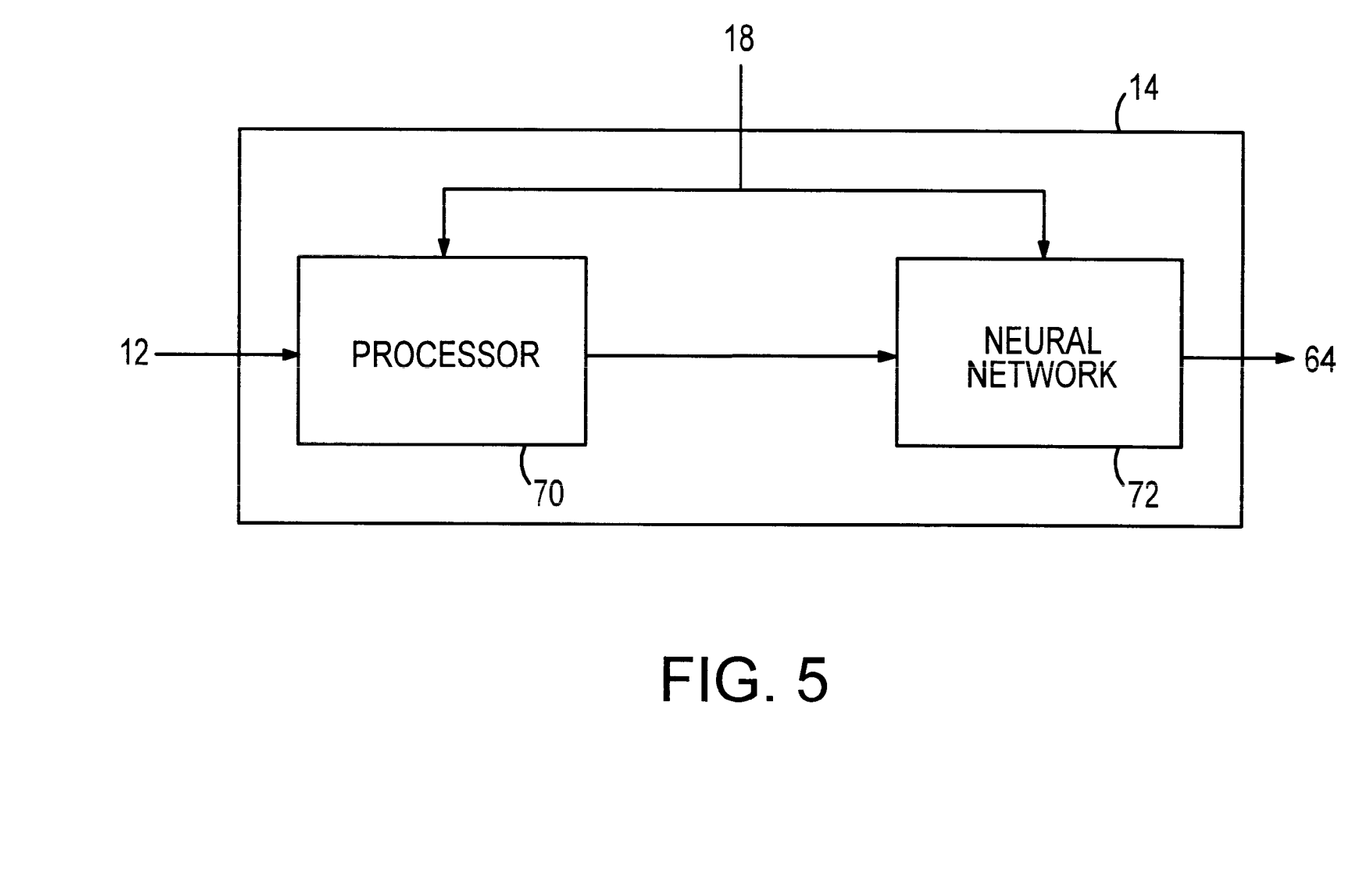
FIG. 5 is a block diagram of components of a face detector, shown in FIG. 1.

Turning now to FIG. 5, components of the face detector 14 are shown. The face detector 14 includes a preprocessor 70 and a neural network 72. The preprocessor 70 is connected to the decision module 64 of the candidate selector 12 to receive the selected candidate regions. For each candidate region, the preprocessor 70 removes the DC component of the region, normalizes the region, and compensates for poor image quality caused by an undesirable lighting condition during an imaging process. Next, the pre-processed candidate region is transmitted to the neural network 72. The neural network 72 determines whether the candidate region contains a human face. The neural network 72 generates an output signal in response to the determination regarding all the candidate regions. The output signal is then transmitted to the display device 20.

In the most preferred embodiment of FIG. 1, the image scaler 11, the candidate selector 12, the face detector 14, and the filtering-kernel generator 16 are embodied in a computer program executed by a micro-processor (not shown). The face detection scheme of this embodiment is a modification of the fast version of the neural network-based face detection scheme of Rowley et al. Therefore, the face detection scheme of Rowley et al. will be described prior to a description of the face detection scheme utilized by the face detection system 10.

The fast version of Rowley et al. face detection scheme consists of first applying, at each scale, a candidate neural network (NN) on 30×30 pixel regions (image blocks) of the input image, the centers of which are located at positions (i, j), where i and j are multiples of ten. That is, the centers of the image blocks are taken from a grid of points separated each from the other by steps of ten pixels. The candidate NN selects regions that the candidate NN believes to contain a human face. Next, a location NN is utilized to estimate a more exact location of the face for each selected region. The location NN in essence selects a new region that may be off-centered from the originally selected region. Finally, a verification NN is applied for the new regions to verify whether the new regions do contain a human face. The key points for the fast version of the Rowley et al. face detection scheme are presented below in C-like pseudo-codes that are identified as "original_face_detection_routine( )" and "apply_NN's (l, i, j)".

```
original_face_detection_routine( ) {
    calculate a pyramid of downscaled versions
            of the original image (downscale rate = 1.2);
    for (l = 0;l < number_of_levels_in_pyramid;l++) {
        Define "downscale_image" as the level l of the pyramid;
        for (i = 0;i < height_of_downscale_image;i+=10) {
            for (j = 0;j < width_of_downscale-image; j+=10) {
                apply_NN's(l,i,j);
            }
        }
    }
}
```

```
apply NN's(l,i,j) {
    Pre-process the block centered at position (i,j)
            (remove DC and illumination components, and normalize);
    Apply the Candidate NN at position (i,j);
    if (selected) {
        Apply the Location NN to obtain the
                fine-tuned candidate position (x,y);
        Apply the Verification NN's at position (x,y);
        if (selected) {
            Declare (x,y) as the center of a face at scale l;
        }
    }
}
```

The face detection scheme of the face detection system 10 selectively utilizes parts of the Rowley et al. scheme, as illustrated below in a C-like pseudo-code called "combined_face_detection_routine( )".

```
combined_face_detection routine( ) {
    Calculate a pyramid of downscale versions
            of the original image (downscale rate = 1.2)
    /*For all the levels of the pyramid, except for the last Δl ones,
        use the candidate selection scheme of the candidate selector 12
        as a pre-filter for the NN's. */
    for (l = 0;l < number_of_levels_in_pyramid-Δl;l++) {
        Calculate the DCT-domain convolution of the level l + Δl of
        the pyramid.
        Define "downscale_image" as the level l of the pyramid.
        for (i = 0;i < height_of_downscale_image;i++) {
            for (j = 0;j < width_of_downscale_image;j++) {
                if ((i,j) is selected by the matched filtering decision rule)
                if ((i,j) is selected by the non-linear filter){
                    apply_NN's (l,i,j); /*see pseudo-code for
                    Rowley et al. scheme */
                }
            }
        }
    }
    /*For the last Δl levels of the pyramid, use the
    original scheme. */
    for (l = number_of_levels_in_pyramid-Δl;
    l < number_of_levels_in_pyramid;l++) {
        Define "downscale_image" as the level l of the pyramid.
        for (i = 0;i < height_of_downscale_image;i+=10) {
            for (i = 0;i < width_of_downscale_image;j+=10) {
                apply_NN's(l,i,j); *see pseudo-code for
                Rowley et al. scheme */
            }
        }
    }
}
```

The face detection scheme of the system 10 is used on all scale levels, except for the last Δl, where the original scheme is used. The differences between the Rowley et al. scheme and the scheme of the system 10 are highlighted in the above pseudo-code. The differences include performing the DCT-domain convolution once for each scale level, except for the last Δl. In addition, the internal loop in the scheme of the system 10 is performed for every pixel in the input downscaled image, whereas, in the Rowley et al. scheme, the internal loop is performed only on the pixels on the centers of the image blocks. Lastly, only those pixels that successfully pass the DCT-domain matched filtering decision rule, performed by the processing module 54 of the linear matched filter 56, and the local contrast criterion, performed by the decision module 64 of the non-linear filter 66, are checked by the NN's.

In this most preferred embodiment, the size N of the kernel for the DCT-domain linear convolution and the non-linear filter is 8. In addition, the Δl is 3. Theoretically, Δl should be 5, considering that the kernel size for the verification NN is 20 and the downscaling rate is 1.2 (therefore, $8 \times 1.2^5 = 20$). However, the best results in simulations were obtained for $\Delta l = 3$. Furthermore, the threshold $T_L$ utilized by the processing module 54 of the linear matched filter 56 is equal to 3,000 and the threshold $T_N$ utilized by the decision module 64 of the non-linear filter 66 is equal to 25.

Figure 6:
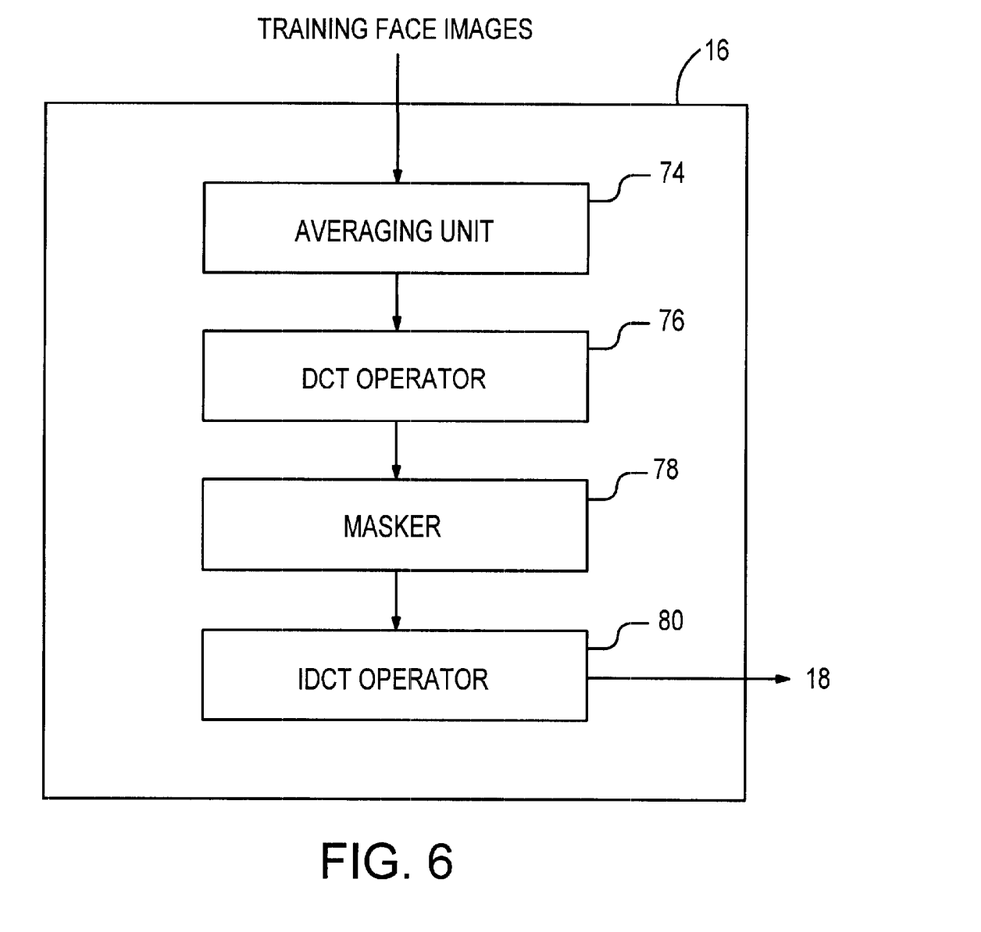
FIG. 6 is a block diagram of components of a filtering-kernel generator, shown in FIG. 1.

In FIG. 6, components of the filtering-kernel generator 16 are shown. The filtering-kernel generator 16 operates to calculate the filtering kernel that is used for the linear convolution operation performed by the linear correlator 52 of the linear matched filter 56. The filtering kernel is calculated by the filtering-kernel generator 16 using a large number of training face images that are input to the filtering-kernel generator. The resulting kernel is designed to compensate for DC, illumination and noise influences on each block of an input image, when used in a linear correlation operation. Preferably, the calculation of the filtering kernel is performed during a training period (off-line), rather than during a face detection period (on-line). The face detection period is when the face detection system 10 is operating on an input image to detect human faces that may be depicted in the image. The calculation of the filtering kernel need only be performed once by the filtering-kernel generator 16.

Figure 7:
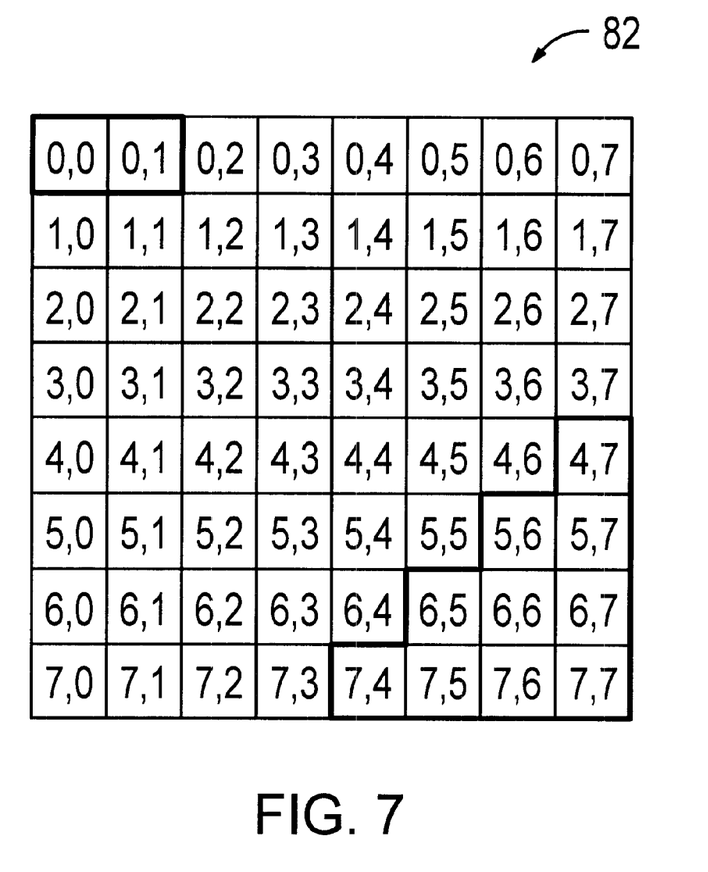
FIG. 7 is an illustration of a mask that is utilized by the filtering-kernel generator of FIG. 6.

The filtering-kernel generator 16 includes an averaging unit 74, a discrete cosine transform (DCT) operator 76, a masker 78 and an inverse discrete cosine transform (IDCT) operator 80. The averaging unit 74 is configured to receive the training face images. The face images are 8×8 pixel images. The averaging unit 74 is designed to average the received faces images to derive an averaged image. The DCT operator 80 then transforms the averaged image from the spatial domain to the DCT domain. The masker 78 operates to discard DC, illumination and noise components from the transformed image using a mask 82, shown in FIG. 7. The mask 82 shows the frequency components that are discarded by the masker 78. The discarded components are shown in FIG. 7 as blocks that are outlined by darkened lines. The blocks (0,0) and (0,1) represent DC and the illumination components, respectively. The lower triangle defined by the blocks (4,7), (5,6), (5,7), (6,5), (6,6), (6,7), (7,4), (7,5), (7,6) and (7,7) represent noise components.

After the averaged image has been masked, the IDCT operator 80 transforms the masked image back to the spatial domain. The resulting image is the filtering kernel. The filtering kernel is then transmitted to the memory 18 for storage until requested by the filtering correlator 52 of the candidate selector 12. Mathematical operations performed by the filtering-kernel generator 16 are described below.

In an alternative configuration, the components of the filtering-kernel generator 16 are rearranged such that the training face images are first transformed from the spatial domain to the DCT domain, masked, transformed back to the spatial domain, and then averaged to derive the filtering kernel. In this alternative configuration, the DCT operator 76 is positioned to receive the training images. The DCT operator 76 transforms each received training face image from the spatial domain to the DCT domain. The transformed face images are then transmitted to the masker 78. The masker 78 discards the DC, illumination and noise components from the transformed face images using the mask 82 of FIG. 7 and transmits the masked face images to the IDCT operator 80. The IDCT operator 80 transforms the masked face images back to the spatial domain. The averaging unit 74 is coupled to the IDCT operator 80 to receive the masked face images in the spatial domain. The face images are averaged by the averaging unit 74 to derive the filtering kernel, which is then transmitted to the memory 18.

In an alternative embodiment, the filtering-kernel generator 16 is not included in the face detection system 10. In this embodiment, the filtering kernel is calculated by the filtering kernel 16 that is located external to the face detection system 10. The calculated filtering kernel can be transmitted to the memory 18 for storage.

Figure 8:
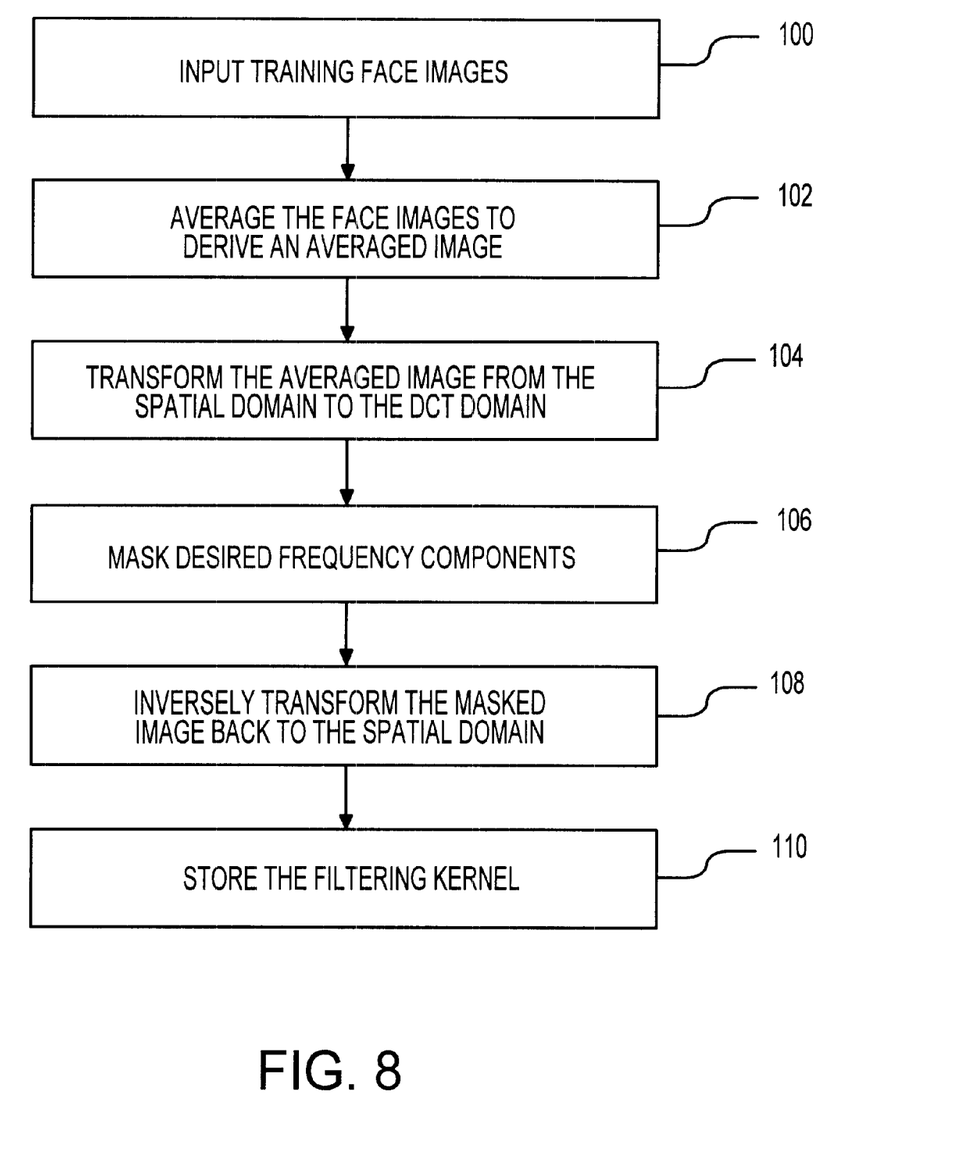
FIG. 8 is a flow diagram of a process of calculating a filtering kernel in accordance with the present invention.
Figure 9:
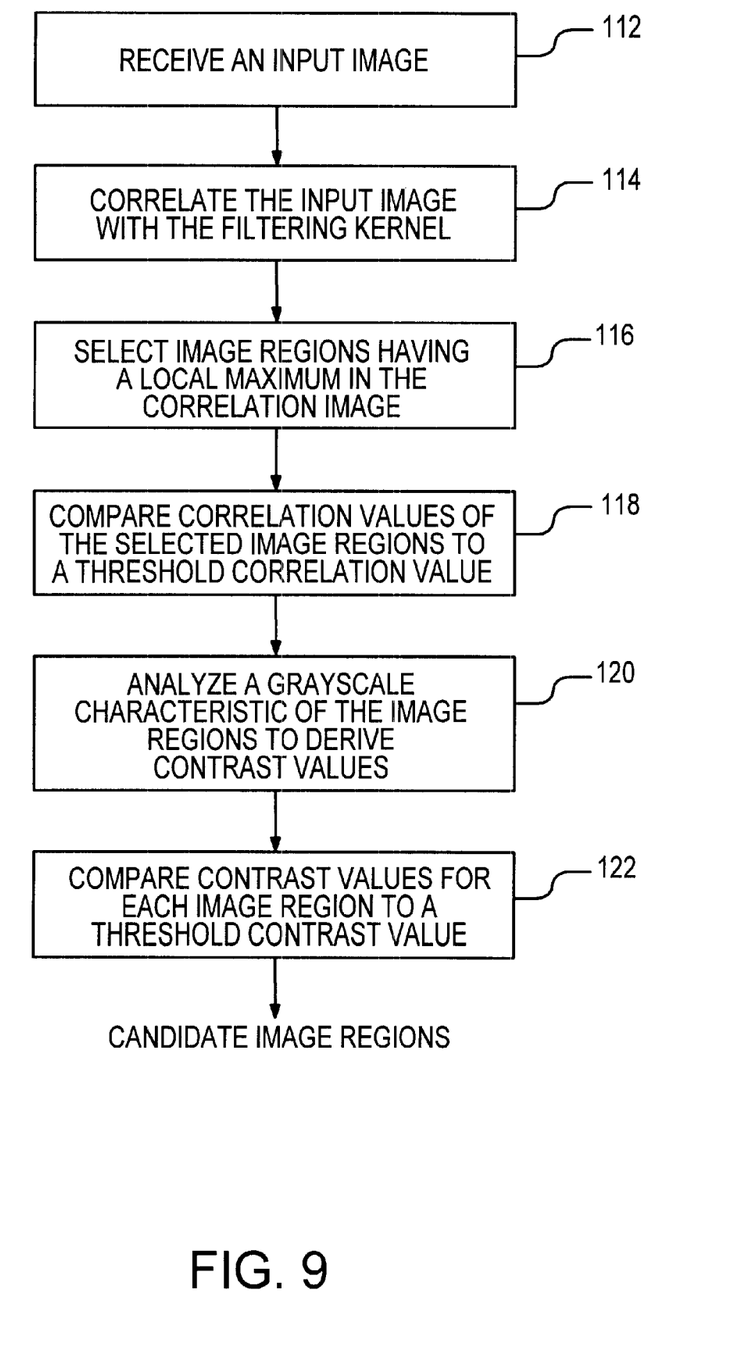
FIG. 9 is a flow diagram of a process of pre-filtering an input image to select candidate regions of the input image that potentially contain a human face for face detection in accordance with the present invention.

A method of pre-filtering an input image to select candidate regions of the input image that potentially contain a human face for face detection will be described with reference to FIGS. 8 and 9. FIG. 8 is a flow diagram of a process to derive the filtering kernel, during a training period. FIG. 9 is a flow diagram of a process to pre-filter the input image to select the candidate regions, during a face detection operation. The process of deriving the filtering kernel will be described first. At step 100, a number of training face images are input to the filtering-kernel generator 16, during the off-line period. Next, at step 102, the face images are averaged by the averaging unit to derive an averaged image. The averaged image is then transformed from the spatial domain to the DCT domain by the DCT operator 76, at step 104. At step 106, frequency components corresponding to DC, illumination and noise influences of the transformed image are masked by the masker 78. Next, at step 108, the masked image is inversely transformed back to the spatial domain by the IDCT operator 80. The resulting image is the filtering kernel. At step 110, the filtering kernel is stored in the memory 18, until requested by the candidate selector 12 of the face detection system 10, during a face detection operation.

In an alternative embodiment, the training face images are not averaged until the images are first masked. In this embodiment, the training face images are initially transformed from the spatial domain to the DCT domain by the DCT operator 76. Next, the transformed face images are masked by the masker 78 and then transformed back to the spatial domain by the IDCT operator 80. The averaging unit 76 averages the masked images in the spatial domain to derive the filtering kernel. Lastly, the filtering kernel is stored in the memory 18. Although the alternative embodiment is less efficient, the resulting filtering kernel is identical to the filtering kernel derived through the former embodiment.

The on-line process to pre-filter the input image to select the candidate regions will now be described. At step 112 of FIG. 9, an input image is received by the face detection system 10. Next, at step 114, the input image is linearly correlated with the filtering kernel by the linear correlator 52 of the linear matched filter 56 to derive a correlation image. Preferably, the linear correlation is performed in the DCT domain. At step 116, image regions of the input image having a local maximum in the correlation image are selected by the processing module 54 of the linear matched filter 56. At step 118, the selected image regions are then checked by the processing module 54 to determine whether each pixel correlation value of the selected image regions exceeds a correlation threshold value. The image regions that satisfy this threshold criterion are allowed to proceed.

At step 120, a grayscale characteristic of each selected image region is analyzed by the non-linear filter 66, including computing contrast values for various sub-regions of the image region. Preferably, the various sub-regions are confined to an upper half area of each image region. Next, at step 122, each contrast value for a particular image region is compared to a threshold contrast value by the decision module 64 of the non-linear filter 66. Only the image regions with contrast values that exceed the threshold contrast value are deemed to be candidate regions. The candidate regions can then be further processed by any conventional face detector, such as the face detector 14, to verify whether the candidate regions contain a human face. Depending upon the type of face detector utilized, the steps 114–122 may be repeated for each scaled-down version of the received image to select candidate regions that potentially contain faces of different sizes.

In a less preferred embodiment, steps 114, 116 and 118 are deleted from the pre-filtering process. In this embodiment, every image region of the received image is analyzed by the non-linear filter 66 to derive the contrast values, instead of analyzing only the image regions having a local maximum in the correlation image. The image regions having contrast values that exceed the threshold contrast value are deemed to be the candidate regions, regardless of the correlation values. In another less preferred embodiment, the steps 120 and 122 are deleted from the face detecting process. In this embodiment, the image regions that have correlation values exceeding the threshold correlation value are deemed to be the candidate regions. The contrast values of the image regions are irrelevant in this embodiment.

MATHEMATICAL FOUNDATION

A mathematical description will be presented to set forth the operations of the linear correlator 52 of the non-linear matched filter 56 and the filtering-kernel generator 16. Initially, the input image is partitioned into non-overlapping N×N blocks. At each step of the filtering operation, four adjacent blocks among these image blocks are considered, and denoted $x_i$, i=1, ..., 4. An (N+1)×(N+1) block r is calculated as described below. Then, the N×N block composed of the N left-most columns and the N upper rows of the block r form one corresponding block of the filtered image, which is also composed of non-overlapping N×N blocks. The above should be repeated for each group of four adjacent blocks of the input image, until all the blocks of the output (filtered) image are calculated.

Given the N×N filtering kernel y provided by the filtering-kernel generator 16, the linear correlator 52 of the linear matched filter 56 operates to calculate the (N+1)×(N+1) block r obtained by the linear convolution of x by y:

$$r(n,m) = \sum_{p=0}^{N-1}\sum_{q=0}^{N-1} y(p,q) \cdot x(p+n, q+m), \quad 0 \le n, m \le N. \qquad \text{Eqn. 1}$$

The above is equivalent to the following matricial form:

$$\vec{r} + Y_1\vec{x}_1 + Y_2\vec{x}_2 + Y_3\vec{x}_3 + Y_4\vec{x}_4, \qquad \text{Eqn. 2}$$

where $\vec{x}_i$, i=1, ..., 4 are the column-stack vector representations of $x_i$, respectively and $Y_i$, i=1, ..., 4, are $(N+1)^2 \times N^2$ matrices that perform the required convolution operation. The matrix $Y_1$ is given by:

$$Y_1[n(N+1)+m, pN+q] = \qquad \text{Eqn. 3}$$
$$\begin{cases} y(q-m, p-n), & \text{if } p-N < n \le p \text{ and} \\ & q-N < m \le q \\ 0, & \text{otherwise.} \end{cases}$$

The matrices $Y_i$, i=2, 3 and 4 have similar formats. The matrix $Y_2$ is given by:

$$Y_2[n(N+1)+m, pN+q] = \qquad \text{Eqn. 4}$$
$$\begin{cases} y(q-m, p+N-n), & \text{if } p < n \le p+N \text{ and} \\ & q-N < m \le q \\ 0, & \text{otherwise.} \end{cases}$$

The matrix $Y_3$ is given by:

$$Y_3[n(N+1)+m, pN+q] = \qquad \text{Eqn. 5}$$
$$\begin{cases} y(q+N-m, p-n), & \text{if } p-N < n \le p \text{ and} \\ & q < m \le q+N \\ 0, & \text{otherwise.} \end{cases}$$

Finally, the matrix $Y_4$ is given by:

$$Y_4[n(N+1)+m, pN+q] = \qquad \text{Eqn. 6}$$
$$\begin{cases} y(q+N-m, p+N-n), & \text{if } p < n \le p+N \text{ and} \\ & q < m \le q+N \\ 0, & \text{otherwise.} \end{cases}$$

The goal is to obtain the calculation of r in an efficient alternative way, via the DCT-domain. The solution given by an implicit scheme is expressed by the following equations:

$$\vec{r} C_I^{-1}\{Y_a\vec{X}_a^c + Y_b\vec{X}_b^c + Y_c\vec{X}_c^c + Y_d\vec{X}_d^c\} \qquad \text{Eqn. 7}$$

$$X_a^c \underline{\Delta} X_1^c + \phi X_2^c + X_3^c\phi + \phi X_4^c\phi, \qquad \text{Eqn. 8}$$

$$X_b^c \underline{\Delta} X_1^c - \phi X_2^c + X_3^c\phi - \phi X_4^c\phi, \qquad \text{Eqn. 9}$$

$$X_c^c \underline{\Delta} X_1^c + \phi X_2^c - X_3^c\phi - \phi X_4^c\phi, \qquad \text{Eqn. 10}$$

$$X_d^c \underline{\Delta} X_1^c - \phi X_2^c - X_3^c\phi + \phi X_4^c\phi, \qquad \text{Eqn. 11}$$

where $C_I^{-1}$ is the inverse DCT of type 1-e (defined below), $X_i^c$, i=1, ..., 4, are the DCT coefficients of type 2-e (defined below) of the blocks $x_i$, respectively, $Y_i$, i∈{a, b, c, d}, are $(N+1)^2 \times N^2$ kernel matrices (characterized below), and the matrix $\phi$ is the diagonal modulation matrix $\phi \underline{\Delta}$ diag $\{(-1)^p\}$, p=0, ..., N−1. Notice that the left multiplication of a matrix by $\phi$ causes sign-reversal of its even rows, whereas the right multiplication by $\phi$ causes sign-reversal of its even columns.

Before the DCT transforms are defined and the above kernel matrices are characterized, the implicit filtering scheme performed by the linear correlator 52, which is highlighted by the equations 7–10, is summarized, as follows:

1. Each block $x_i$, i=1, ..., 4, is transformed by a 2–D DCT of type 2–e.

2. The transformed blocks are then combined by means of a 2–D butterfly (equations 8–11). Note that, within this butterfly operation, the matrices $X_i^c$, i=2, 3, 4, have the signs in their even columns and/or rows reversed.

3. The butterflied matrices are then column stacked and premultiplied each by a kernel matrix, and then summed.

4. Finally, inverse DCT of type 1–e is applied to the resulting block, and the correlation vector is obtained.

The forward DCT of type 2–e, $X^c$, of a block x is defined here, for $0 \le p, q \le N-1$, as:

$$X^c(p, q) \triangleq \sum_{n=0}^{N-1} \sum_{m=0}^{N-1} y(n, m) \cos\left(\frac{\pi p\left(n + \frac{1}{2}\right)}{N}\right) \cos\left(\frac{\pi q\left(m + \frac{1}{2}\right)}{N}\right). \quad \text{Eqn. 12}$$

In addition, the N×N DCT matrix $C_{II}$ that performs 2D DCT of type 2-e when applied to a stack-column vector is defined as:

$$C_{II} \cdot x = X^c. \quad \text{Eqn. 13}$$

The inverse DCT of type 1-e of a block $Y^c$ is defined here, for $0 \leq n, m \leq N$, as:

$$C_{\underline{I(N-1)}}^{-1}\{Y^c\}(n, m) \triangleq \quad \text{Eqn. 14}$$

$$\sum_{p=0}^{N} \sum_{q=0}^{N} \frac{c(p)c(q)}{N\sqrt{2}} Y^c(p, q) \cos\left(\frac{\pi p n}{N}\right) \cos\left(\frac{\pi q m}{N}\right),$$

where $c(0)=c(N)=\frac{1}{2}$, and $c(k)=1, \ldots, N-1$. Notice that, as defined above, the inverse DCT of type 1-e has (N+1)×(N+1) blocks as input and output. Furthermore, the (N+1)×(N+1) inverse DCT matrix $C_I^{-1}$ that performs inverse 2D DCT of type 1-e when applied to a stack-column vector $X^{cI}$ is defined as $C_I^{-1} \cdot X^{cI} = x$. In the sequel, the matrix $C_I$ will denote the forward 2D DCT transformation of type 1-e, given by the inverse of $C_I^{-1}$.

The kernel matrices $Y_i$, $i \in \{a, b, c, d\}$ are characterized by the following equations.

$$Y_a = \frac{1}{4} C_I \{Y_1 C_{II}^{-1} + Y_2 C_{II}^{-1} (I \otimes \phi) + Y_3 C_{II}^{-1} (\phi \otimes I) + Y_4 C_{II}^{-1} (\phi \otimes \phi)\}, \quad \text{Eqn. 15}$$

$$Y_b = \frac{1}{4} C_I \{Y_1 C_{II}^{-1} + Y_2 C_{II}^{-1} (I \otimes \phi) - Y_3 C_{II}^{-1} (\phi \otimes I) - Y_4 C_{II}^{-1} (\phi \otimes \phi)\}, \quad \text{Eqn. 16}$$

$$Y_c = \frac{1}{4} C_I \{Y_1 C_{II}^{-1} - Y_2 C_{II}^{-1} (I \otimes \phi) + Y_3 C_{II}^{-1} (\phi \otimes I) - Y_4 C_{II}^{-1} (\phi \otimes \phi)\}, \quad \text{Eqn. 17}$$

$$Y_d = \frac{1}{4} C_I \{Y_1 C_{II}^{-1} - Y_2 C_{II}^{-1} (I \otimes \phi) - Y_3 C_{II}^{-1} (\phi \otimes I) + Y_4 C_{II}^{-1} (\phi \otimes \phi)\}, \quad \text{Eqn. 18}$$

where $\otimes$ denotes Kronecker product, and I denotes the N×N identity matrix.

An analysis of the kernel matrices $Y_i$, $i \in \{a, b, c, d\}$, when they are given a function of DCT and DST coefficients (not shown here), leads to a conclusion that computational savings are achieved by the implicit scheme, especially when symmetries and/or data sparseness are present. Symmetries relate to the cases where the original filtering kernel is horizontally and/or vertically symmetric in the spatial domain. When both symmetries exist, the scheme is about twice as fast as compared to when just one of them exists. Notice that horizontal symmetry usually exists for face templates. The data sparseness is the situation where the input-image DCT blocks are sparse, i.e., most of its coefficients are zero. Note that this is a typical situation for natural images. Moreover, the few non-zero coefficients are usually located in the upper-left quadrant of the DCT blocks. Therefore, in this case, only part of the kernel matrices has to be used in the calculation; that part of the matrices that multiply the DCT coefficients located at the upper-left quarter of the input block. Whenever this can be done, the number of operations is divided by approximately 4.

What is claimed is:

1. A method of pre-filtering an input image to determine whether said input image includes a target image pattern of interest comprising steps of:

receiving said input image;

correlating said input image with preselected reference data to derive a correlation image, said preselected reference data being representative of said target image pattern of interest, said correlation image having image data indicative of correlations between said input image and said preselected reference data; and selecting a candidate region of said input image having a likelihood of containing said target image pattern of interest on a basis of correlating said input image with said preselected reference data, said step of selecting including identifying potential candidate regions of said input image based on detecting a local maximum in said correlation image and screening said potential candidate regions by analyzing a grayscale characteristic of said potential candidate regions, said screening including discarding said potential candidate regions that do not satisfy a predetermined criterion with respect to said grayscale characteristic in order to increase a probability that said selected candidate region contains said target image pattern of interest.

2. The method of claim 1 wherein said step of screening said potential candidate regions further includes comparing a contrast value calculated for a sub-region of each potential candidate region to a threshold contrast value, said target image pattern of interest being a human face.

3. The method of claim 2 wherein said step of comparing said contrast value is a step of comparing said contrast value from said sub-region of said each potential candidate region that is located in an upper-half portion of said each potential candidate region.

4. The method of claim 1 further comprising a step of calculating said preselected reference data utilizing a plurality of training images containing said target image pattern of interest, thereby forming a convolution kernel.

5. The method of claim 4 wherein said step of forming said convolution kernel includes masking a particular frequency component of an averaged image derived from said training images to remove an undesired image characteristic from said averaged image.

6. The method of claim 1 wherein said step of correlating said input image with said preselected reference data includes removing an undesired image characteristic from said input image, said removal being effectuated by a mathematical property of said preselected reference data.

7. The method of claim 1 wherein said step of selecting said candidate region further includes comparing correlation values associated with each of said potential candidate regions to a threshold correlation value.

8. The method of claim 1 wherein said step of correlating said input image with said preselected reference data is performed in a discrete cosine transform (DCT) domain.

9. A method of pre-filtering an input image to select a candidate region of interest that potentially contains a predetermined image pattern comprising steps of:

receiving said input image;

examining a grayscale characteristic of a particular image region of said input image as a determination factor in determining whether said particular image region has a likelihood of containing said predetermined image pattern, including comparing a contrast value from a sub-region of said particular image region to a threshold contrast value as a basis for said determination, said particular image region being identified by correlating said input image with a reference image; and designating said particular image region as said candidate region for said image pattern detection.

10. The method of claim 9 further comprising a step of selecting said particular image region from a plurality of image regions of said input image, said selection being at least partly determined by identifying which of said image regions includes a local maximum in a correlation image that is generated by correlating said input image with a convolution kernel that is representative of said predetermined image pattern, said predetermined image pattern being indicative of a human face.

11. The method of claim 10 wherein said step of selecting said particular image region from said plurality of image regions includes comparing correlation values that correspond to each identified image region having said local maximum to a correlation threshold value.

12. The method of claim 10 further comprising a step of generating said convolution kernel by utilizing a plurality of training images, said convolution kernel having a correlation property to filter an undesired image characteristic of said input image during a correlation operation.

13. The method of claim 12 wherein said step of generating said convolution kernel includes masking a frequency component of each training image, said frequency component corresponding to said undesired image characteristic.

14. The method of claim 9 wherein said step of comparing said contrast value from said sub-region is a step of comparing said contrast value from said sub-region located in an upper-half portion of said image region.

15. An image processing system for detecting a target image pattern in an input image comprising:

first filtering means configured for identifying a plurality of image regions of said input image that have a likelihood of containing said target image pattern, said filtering means being configured to correlate said input image with a reference image pattern to select said image regions, said reference image pattern being indicative of said target image pattern;

second filtering means operatively coupled to and operatively following said first filtering means for screening said image regions to select a candidate region that has a high likelihood of containing said target image pattern, said second filtering means being configured to examine a grayscale characteristic of said image regions as a determination factor in selecting said candidate region from among said image regions; and an image pattern detector connected to and operatively following said second filtering means to receive said candidate region, said image pattern detector designed to analyze said candidate region to verify whether said candidate region contains said target image pattern.

16. The system of claim 15 wherein said first filtering means includes a linear matched filter configured to perform a linear convolution operation on said input image with a convolution kernel, said convolution kernel being a numerical representation of said reference image pattern, said reference image pattern being representative of a human face.

17. The system of claim 16 wherein said linear matched filter is a discrete cosine transform (DCT) linear matched filter that is designed to perform said linear convolution operation in a DCT domain.

18. The system of claim 16 further comprising a calculating means operatively associated with said linear matched filter for generating said convolution kernel from a plurality of training images, said calculating means including a masker to remove a particular frequency component of said training images that corresponds to an undesired image characteristic.

19. The system of claim 15 wherein said second filtering means includes a non-linear filter coupled in series to said first filtering means, said non-linear filter configured to select said candidate region by comparing a computed contrast value from a sub-region of each identified image region to a threshold contrast value.

* * * * *

Disclaimer

6,463,163 B1 - Renato Kresch, Haifa (IL). SYSTEM AND METHOD FOR FACE DETECTION USING CANDIDATE IMAGE REGION SELECTION. Patent dated October 8, 2002. Disclaimer filed June 7, 2018, by the inventor.

I hereby disclaim the following complete claims 9-14 of said patent.

*(Official Gazette, September 6, 2022)*